US012785173B2

(12) United States Patent
Wang et al.

(10) Patent No.: US 12,785,173 B2
(45) Date of Patent: Nov. 3, 2026

(54) BATTERY PACK

(71) Applicant: BYD COMPANY LIMITED, Shenzhen (CN)

(72) Inventors: Yongnan Wang, Shenzhen (CN); Yi Zeng, Shenzhen (CN); Zhengyuan Liao, Shenzhen (CN); Fuzhu Lai, Shenzhen (CN); Weixin Zheng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 729 days.

(21) Appl. No.: 18/126,736

(22) Filed: Mar. 27, 2023

(65) Prior Publication Data

US 2023/0231227 A1 Jul. 20, 2023

Related U.S. Application Data

(63) Continuation of application No. PCT/CN2021/107066, filed on Jul. 19, 2021.

(30) Foreign Application Priority Data

Sep. 27, 2020 (CN) ......................... 202011032009.2

(51) Int. Cl.
*H01M 10/6568* (2014.01)
*H01M 10/6554* (2014.01)

(52) U.S. Cl.
CPC ... *H01M 10/6568* (2015.04); *H01M 10/6554* (2015.04)

(58) Field of Classification Search
CPC ......... H01M 10/6568; H01M 10/6554; H01M 10/6556; H01M 10/613; H01M 10/617
See application file for complete search history.

(56) References Cited

U.S. PATENT DOCUMENTS 10,116,015 B2 10/2018 Baumann et al.
2009/0269655 A1* 10/2009 Sakakibara ......... H01M 10/643 429/90

(Continued)

FOREIGN PATENT DOCUMENTS

CN 103178311 A 6/2013
CN 107732061 A 2/2018

(Continued)

OTHER PUBLICATIONS

International Search Report and Written Opinion for Application No. PCT/CN2021/107066, mailed on Sep. 27, 2021, 10 pages.

*Primary Examiner* — Helen Oi K Conley
*Assistant Examiner* — Amanda Rosenbaum
(74) *Attorney, Agent, or Firm* — Sheppard Mullin Richter & Hampton LLP

(57) ABSTRACT

A battery pack includes a battery assembly and a tray. The battery assembly includes at least one battery unit, and the battery unit includes multiple cells, where the length direction of each cell is a first direction, and the multiple cells are disposed along a second direction. The tray includes at least one temperature adjustment unit, where the temperature adjustment unit includes a temperature adjustment flow channel and a confluence flow channel. Any one of the temperature adjustment flow channels is configured to exchange heat with at least one of the cells disposed along the second direction, and to exchange heat with at most one cell disposed along the first direction.

13 Claims, 5 Drawing Sheets

(56) References Cited

U.S. PATENT DOCUMENTS

| | | | | |
|---|---|---|---|---|
| 2011/0132580 | A1* | 6/2011 | Herrmann | H01M 8/2483<br>165/104.33 |
| 2013/0164576 | A1* | 6/2013 | Cha | H01M 10/6554<br>429/72 |
| 2017/0346144 | A1* | 11/2017 | Addanki | H01M 50/271 |
| 2018/0151924 | A1* | 5/2018 | Baumann | H01M 10/6571 |
| 2018/0205125 | A1* | 7/2018 | Burgers | F28F 9/0204 |
| 2018/0212216 | A1* | 7/2018 | Handing | B60K 1/04 |
| 2018/0316072 | A1* | 11/2018 | Xiao | H01M 10/6556 |

FOREIGN PATENT DOCUMENTS

| | | | |
|---|---|---|---|
| CN | 108091803 | A | 5/2018 |
| CN | 108172927 | A | 6/2018 |
| CN | 209016115 | U | 6/2019 |
| CN | 110199430 | A | 9/2019 |
| CN | 110277606 | A | 9/2019 |
| CN | 209544560 | U | 10/2019 |
| CN | 209729994 | U | 12/2019 |
| CN | 209747613 | U | 12/2019 |
| CN | 209860110 | U | 12/2019 |
| CN | 210092152 | U | 2/2020 |
| CN | 210224141 | U | 3/2020 |
| CN | 111129645 | A | 5/2020 |
| CN | 109148771 | B | 7/2021 |
| EP | 0176484 | A2 | 4/1986 |
| EP | 0476484 | A2 | 3/1992 |
| EP | 2343769 | A1 | 7/2011 |

* cited by examiner

BATTERY PACK

CROSS-REFERENCE TO RELATED APPLICATIONS

This application is a Continuation Application of International Patent Application No. PCT/CN2021/107066, filed on Jul. 19, 2021, which claims priority to Chinese Patent Application No. 202011032009.2 filed on Sep. 27, 2020. The entire content of all of the above applications is incorporated herein by reference.

FIELD

The present disclosure relates to the technical field of batteries, and particularly to a battery pack.

BACKGROUND

A bottom plate of a battery pack in related art generally has a serpentine flow channel, and liquid inlet and outlet pipes are located at a head and tail end of the serpentine flow channel. The temperature of a head flow channel section near the liquid inlet pipe is low, leading to a good cooling effect on cells near the liquid inlet pipe; and the temperature of a tail flow channel section near the liquid outlet pipe is high, causing a poor cooling effect on cells near the liquid outlet pipe. Therefore, the overall cooling uniformity of the battery pack is poor.

SUMMARY

The present disclosure provides a battery pack having the advantage of good cooling uniformity.

The battery pack according to an embodiment of the present disclosure includes: a battery assembly, including at least one battery unit, where the battery unit includes multiple cells, the length direction of each cell is a first direction, and the multiple cells are disposed along a second direction; and a tray, including at least one temperature adjustment unit, where the temperature adjustment unit includes a bottom plate and a temperature adjustment flow channel and a confluence flow channel formed on the bottom plate, the temperature adjustment flow channel is disposed opposite to the battery unit in a vertical direction to exchange heat with the cells, the confluence flow channel is disposed to stagger from the battery unit in the vertical direction to prevent heat exchange with the cells, the temperature adjustment flow channel and the confluence flow channel extend in the first direction, and the temperature adjustment flow channel and the confluence flow channel are disposed along the second direction. In the first direction, the temperature adjustment flow channel has an outlet end, the confluence flow channel has an inlet end that communicates with the outlet end of the temperature adjustment flow channel. The second direction intersects the first direction. Any one of the temperature adjustment flow channels in configured to exchange heat with at least one of the cells disposed along the second direction, and to exchange heat with at most one cell disposed along the first direction. The battery pack according to the present disclosure has the advantage of good cooling uniformity.

In some embodiments, the temperature adjustment unit further includes: a communicating flow channel, a liquid inlet and a liquid outlet formed on the bottom plate. The liquid inlet communicates with the temperature adjustment flow channel, the liquid outlet communicates with the confluence flow channel, the communicating flow channel is disposed adjacent to the outlet end of the temperature adjustment flow channel and the inlet end of the confluence flow channel. The communicating flow channel causes the outlet end of the temperature adjustment flow channel to be in communication with the inlet end of the confluence flow channel. The liquid inlet and the liquid outlet are disposed on a side of the temperature adjustment flow channel and the confluence flow channel in the first direction away from the communicating flow channel.

In some embodiments, two ends of the bottom plate in the first direction are respectively a first end portion and a second end portion, where the liquid inlet and the liquid outlet are located at the first end portion, and the communicating flow channel is located at the second end portion.

In some embodiments, the bottom plate includes a first bottom plate and a second bottom plate disposed opposite to each other in a thickness direction of the bottom plate, where the temperature adjustment flow channel and the confluence flow channel are disposed between the first bottom plate and the second bottom plate, and the liquid inlet and the liquid outlet are formed to penetrate the first bottom plate.

In some embodiments, at least one temperature adjustment unit includes multiple temperature adjustment flow channels including the temperature adjustment flow channel, and the outlet end of each of the temperature adjustment flow channel communicates with the inlet end of the confluence flow channel.

In some embodiments, the temperature adjustment flow channels are disposed on the same side of the confluence flow channel along the second direction.

In some embodiments, the at least one temperature adjustment unit includes two temperature adjustment units, disposed at an interval along the second direction. Each of the two temperature adjustment units includes a plurality of temperature adjustment flow channels and a confluence flow channel.

In some embodiments, the tray further includes a frame, where the frame is connected to the bottom plate and defines an accommodating cavity with the bottom plate. The frame includes a support beam extending in the first direction, where the support beam is located above a portion between the temperature adjustment units, and the confluence flow channel in each temperature adjustment unit is disposed opposite to each other with respect to the support beam in the vertical direction.

In some embodiments, the at least one temperature adjustment unit includes N temperature adjustment flow channels and M confluence flow channels, where M is an integer greater than or equal to 1, and N is an integer greater than or equal to 1; and the sum of width of the N temperature adjustment flow channels is greater than the sum of width of the M confluence flow channels.

In some embodiments, at least one temperature adjustment unit includes: an adapter piece, having a first flow channel and a second flow channel separated from each other therein, where the first flow channel communicates with the temperature adjustment flow channel, and the second flow channel communicates with the confluence flow channel; and an external connecting tube, including a liquid inlet pipe and a liquid outlet pipe, where the liquid inlet pipe is connected to the adapter piece and communicates with the first flow channel, and the liquid outlet pipe is connected to the adapter piece and communicates with the second flow channel.

Additional aspects and advantages of the present disclosure will be partly given in the following description, some of which will become apparent from the following description, or may be learned from practices of the present disclosure.

LIST OF REFERENCE NUMERALS

Figure 1:
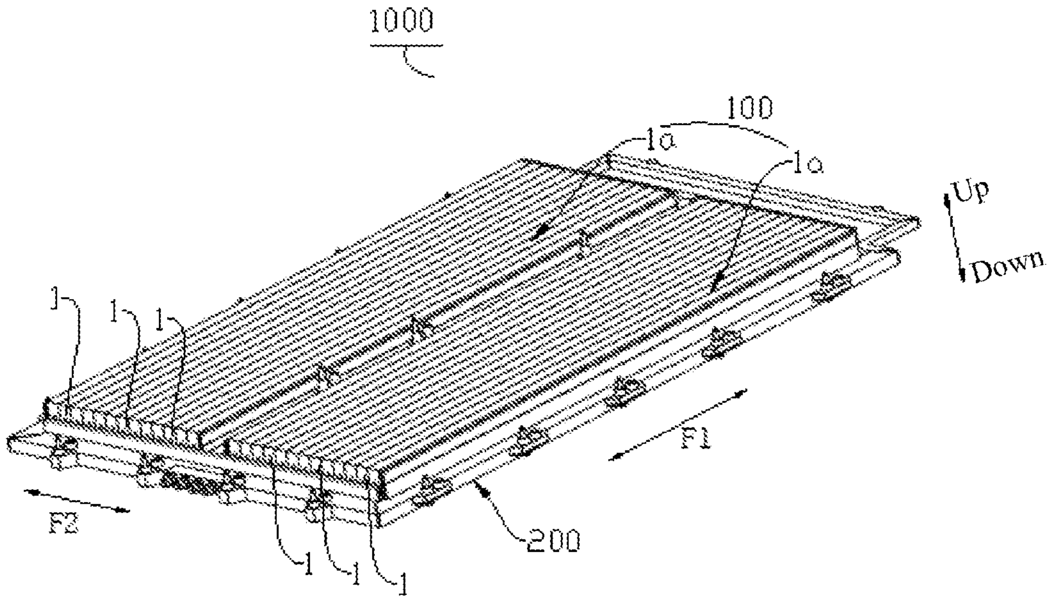
FIG. 1 is a three-dimensional diagram of a battery pack according to an embodiment of the present disclosure.

1000 battery pack;
100 battery assembly; 1*a* battery unit; 1 cell;
200 tray; 2*a* temperature adjustment unit; 2*b* preset unit;
2 bottom plate; 20 bottom plate flow channel;
201 temperature adjustment flow channel; 2010 outlet end;
202 confluence flow channel; 2020 inlet end;
203 communicating flow channel;
21 first bottom plate; 211 liquid inlet; 212 liquid outlet; 213 communicating liquid port;
22 second bottom plate;
23 first end portion; 24 second end portion;
3 frame; 30 accommodating cavity;
31 support beam; 311 sink; 312 first connecting tube accommodating groove;
3121 second accommodating groove; 3122 third accommodating groove;
32 first side beam; 321 first accommodating groove;
33 mounting seat; 331 second connecting tube accommodating groove;
3311 fourth accommodating groove; 3312 fifth accommodating groove;
4 adapter piece; 40 joining flow channel; 401 first flow channel; 402 second flow channel;
41 first connecting portion; 410 bottom plate connection port; 4101 first connection port; 4102 second connection port;
42 second connecting portion; 420 connecting tube connection port; 4201 liquid inlet connection port; 4202 liquid outlet connection port;
431 top surface; 432 bottom surface; 433 inner side surface; 434 outer side surface;
44 partition groove;
5 external connecting tube; 501 inner end; 502 outer end; 51 liquid inlet pipe; 52 liquid outlet pipe;
6 welded connecting tube; 61 first connecting tube; 62 second connecting tube.

DETAILED DESCRIPTION

Embodiments of the present disclosure are described in detail below, and examples of the embodiments are shown in accompanying drawings, where the same or similar elements or the elements having the same or similar functions are denoted by the same or similar reference numerals throughout the description. The embodiments described below with reference to the accompanying drawings are exemplary, and provided merely for explaining the present disclosure, and should not be construed as a limitation on the present disclosure.

Various embodiments or examples are provided in the disclosure below for implementing various structures of the present disclosure. To simplify the present disclosure, components and configurations of particular examples are described below. However, they are merely exemplary and do not limit the present disclosure. In addition, the present disclosure may repeat reference numerals and/or letters in the various examples. This repetition is for the purpose of simplicity and clarity and does not in itself dictate a relationship between the various embodiments and/or configurations discussed. Moreover, examples of various specific processes and materials are provided in the present disclosure; however, those ordinarily skilled in the art will recognize the applicability of other processes and/or the use of other materials.

A battery pack 1000 according to some embodiments of the present disclosure is described below with reference to accompanying drawings.

Figure 2:
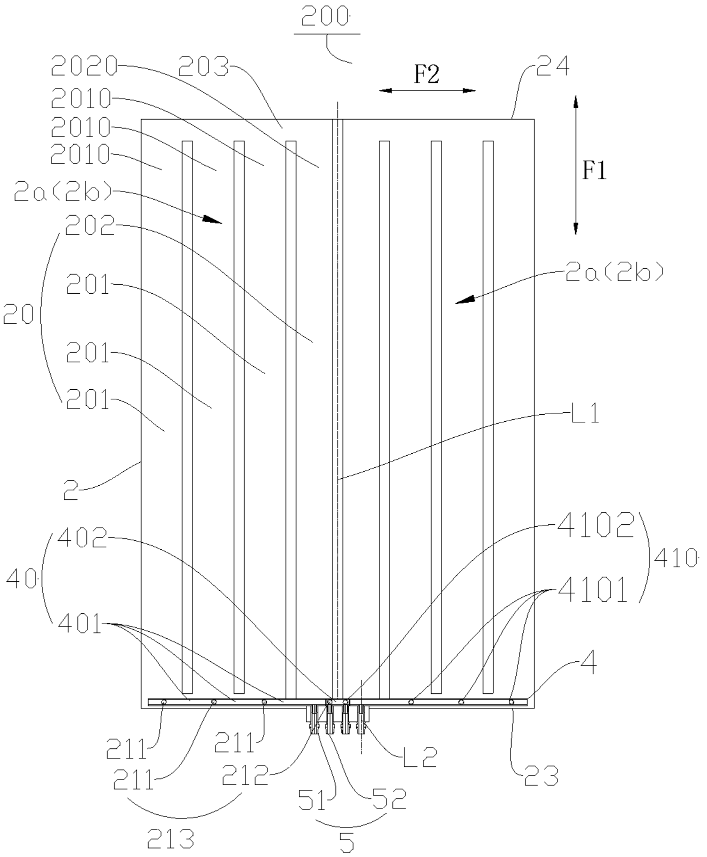
FIG. 2 is a cross-sectional view of a tray according to an embodiment of the present disclosure.

As shown in FIG. 1, the battery pack 1000 according to an embodiment of the present disclosure includes a battery assembly 100 and a tray 200. The battery assembly 100 includes at least one battery unit 1*a*. The battery unit 1*a* includes multiple cells 1, where the length direction of each cell 1 is a first direction F1, and the multiple cells 1 are disposed along a second direction F2; and the second direction F2 intersects the first direction F1. In some embodiments, the thickness direction of the cell 1 is the second direction F2. Referring to FIG. 2, the tray 200 includes at least one temperature adjustment unit 2*a*, and the temperature adjustment unit 2*a* is configured to adjust the temperature of the battery unit 1*a*.

It should be noted that "adjust the temperature" as described herein may include increasing and decreasing the temperature. For ease of description, the present disclosure is described in connection with an example where the temperature is decreased. In this case, the temperature adjusting fluid is a cooling liquid. Moreover, it should be noted that the number of the temperature adjustment unit 2*a* can be set as desired by the number of the battery unit 1*a* required to be cooled actually. For example, in some examples, the number of the temperature adjustment unit 2*a* is equal to the number of the battery unit 1*a*, to arrange them in one-to-one correspondence. However, the present disclosure is not limited thereto. In some other examples, the number of the temperature adjustment unit 2*a* may be greater than or less than the number of the battery unit 1*a*, no further description is given here.

Referring to FIG. 2, the temperature adjustment unit 2*a* includes a bottom plate 2 and a temperature adjustment flow channel 201 and a confluence flow channel 202 formed on the bottom plate 2. The temperature adjustment flow channel 201 and the battery unit 1*a* are disposed with respect to each other in a vertical direction (as shown in FIG. 1) (that is, the temperature adjustment flow channel 201 is located right below the battery unit 1*a*) to exchange heat with the cells 1. The confluence flow channel 202 is disposed to stagger from the battery unit 1*a* in the vertical direction (that is, not opposite to each other in the vertical direction, that is, the confluence flow channel 202 is located obliquely below the battery unit 1*a*) to prevent heat exchange with the cells 1.

As shown in FIG. 2, the temperature adjustment flow channel 201 and the confluence flow channel 202 extend in the first direction F1, and the temperature adjustment flow channel 201 and the confluence flow channel 202 are disposed along the second direction F2. In the first direction F1, one end of the temperature adjustment flow channel 201 is an outlet end 2010, one end of the confluence flow channel 202 close to the outlet end 2010 is an inlet end 2020, and the outlet end 2010 of the temperature adjustment flow channel 201 communicates with the inlet end 2020 of the confluence flow channel 202.

In this way, the cooling liquid can flow into the temperature adjustment flow channel 201, then flow forward through the temperature adjustment flow channel 201 along the first direction F1 toward the outlet end 2010 of the temperature adjustment flow channel 201, next flow from the outlet end 2010 of the temperature adjustment flow channel 201 to the inlet end 2020 of the confluence flow channel 202, subsequently flow reversely through the confluence flow channel 202 along the first direction F1, and flow out of the confluence flow channel 202. When the cooling liquid flows through the temperature adjustment flow channel 201, it can cool the cell 1 disposed opposite to the temperature adjustment flow channel 201 in the vertical direction. During the cooling process of the cell 1, the cooling liquid exchanges heat with the hot cell 1. The temperature of the cooling liquid after heat exchange is high, and the high-temperature cooling liquid flows out of the temperature adjustment flow channel 201 into the confluence flow channel 202. During the process of flowing through the confluence flow channel 202, the confluence flow channel 202 will not heat the cell 1, since it is disposed to stagger from the cell 1 in the vertical direction, so as to ensure the reliability of the cooling effect on the cell 1.

Briefly, Because the confluence flow channel 202 is disposed to stagger from the battery unit 1*a* in the vertical direction, the cell 1 is not disposed above the confluence flow channel 202. It can be understood that the temperature of the cooling liquid is low before heat exchange, and the low-temperature cooling liquid flows into the temperature adjustment flow channel 201; and the temperature of the cooling liquid is high after heat exchange, and the high-temperature cooling liquid flows into the confluence flow channel 202. Therefore, only the temperature adjustment flow channel 201 serves to cool the cell 1, and the confluence flow channel 202 only serves to direct the cooling liquid out of the temperature adjustment unit 2*a* without heat exchange with the cell 1, so as to ensure the cooling effect on the cell 1.

Moreover, since the outlet end 2010 of the temperature adjustment flow channel 201 and the inlet end 2020 of the confluence flow channel 202 are located at the same end and communicate with each other in the first direction F1, the cooling liquid can flow forward into the temperature adjustment flow channel 201 along the first direction F1, and then flow reversely out of the confluence flow channel 202 along the first direction F1. Therefore, an inlet end of the temperature adjustment flow channel 201 may be located at the same end with an outlet end of the confluence flow channel 202, so that the liquid inlet and liquid outlet of the temperature adjustment unit 2*a* are located at the same end. Compared with a situation where the liquid inlet and liquid outlet are respectively located at different ends of the temperature adjustment unit 2*a*, the location of the liquid inlet and liquid outlet of the cooling liquid at the same end of the temperature adjustment unit 2*a* reduces the size of the temperature adjustment unit 2*a* in the first direction F1. Accordingly, the size of the bottom plate 2 in the first direction F1 is reduced, and thus the size of the tray 200 in the first direction F1 is reduced. Moreover, the connection to an external device is facilitated.

Any one of the temperature adjustment flow channels 201 in configured to exchange heat with at least one of the cells 1 disposed along the second direction F2. For example, one cell 1 disposed along the second direction F2 is only cooled by one temperature adjustment flow channel 201 disposed along the second direction F2; or the same cell 1 disposed along the second direction F2 is cooled by two or more temperature adjustment flow channels 201 disposed along the second direction F2; or two or more cells 1 disposed along the second direction F2 is cooled by the same temperature adjustment flow channel 201 disposed along the second direction F2.

Any one of the temperature adjustment flow channels 201 in configured to exchange heat with at most one cell 1 disposed along the first direction F1. For example, one cell 1 disposed along the first direction F1 is only cooled by one temperature adjustment flow channel 201 disposed along the first direction F1; or the same cell 1 disposed along the first direction F1 is cooled by two or more temperature adjustment flow channels 201 disposed along the first direction F1. However, two or more cells 1 disposed along the first direction F1 cannot be cooled by the same temperature adjustment flow channel 201 disposed along the first direction F1.

It should be noted that in the flow direction of the cooling liquid, the upstream cooling liquid has a low temperature and thus a good cooling effect, and the downstream cooling liquid has a high temperature and thus a poor cooling effect. Therefore, by the fact that any one of the temperature adjustment flow channel 201 is configured to exchange heat with at most one cell 1 disposed along the first direction F1, the cooling liquid after heat exchange with one cell 1 is avoided to further flow to exchange heat with a next cell 1. This avoids the problem of inconsistent heat dissipation effects on two cells 1 due to the inconsistent temperatures of the cooling liquid, and allows each cell 1 to have a good heat dissipation consistency.

A tray bottom plate in related art that generally has a serpentine flow channel and a liquid inlet and outlet of the cooling liquid located at a head and tail end of the serpentine flow channel. The temperature of a head flow channel section near the liquid inlet is low, leading to a good cooling effect on cells at a corresponding position; and the temperature of a tail flow channel section near the liquid outlet is high, causing a poor cooling effect on cells at a corresponding position. Therefore, the overall cooling uniformity of the battery pack is poor, and the flow resistance is high. Moreover, the liquid inlet and outlet of the cooling liquid in the tray bottom plate are respectively located at two ends of the bottom plate in the length direction, causing a large size of tray bottom plate in the length direction.

According to the battery pack 1000 in accordance with the embodiment of the present disclosure, because the confluence flow channel 202 is disposed to stagger from the battery unit 1*a* in the vertical direction, it does not exchange heat with the cell 1. Only the temperature adjustment flow channel 201 in which the low-temperature cooling liquid flows serves to cool the cell 1, and the confluence flow channel 202 in which the high-temperature cooling liquid flows serves to direct the cooling liquid out of the temperature adjustment unit 2*a* without cooling the cell 1. Moreover, any one of the temperature adjustment flow channels 201 is configured to exchange heat with at most one cell 1 disposed along the first direction F1. Therefore, the cooling consistency of multiple cells 1 is good, and the overall heat dissipation and cooling effect are good.

Furthermore, the inlet end of the temperature adjustment flow channel 201 is located at the same end of the temperature adjustment unit 2*a* in the first direction with the outlet end of the confluence flow channel 202, so that the liquid inlet and liquid outlet of the temperature adjustment unit 2*a* are located at the same end. That is, the liquid inlet and liquid outlet of the cooling liquid are located at the same end of the temperature adjustment unit 2*a* to reduce the size of the temperature adjustment unit 2*a* in the first direction F1.

In some embodiments of the present disclosure, as shown in FIG. 2, the temperature adjustment unit 2*a* further includes: a communicating flow channel 203 formed on the bottom plate 2, a liquid inlet 211 and a liquid outlet 212. The liquid inlet 211 communicates with the temperature adjustment flow channel 201, the liquid outlet 212 communicates with the confluence flow channel 202, and the communicating flow channel 203 is located at the same side of the temperature adjustment flow channel 201 and the confluence flow channel 202 in the first direction F1 and adjacent to the outlet end 2010 of the temperature adjustment flow channel 201 and the inlet end 2020 of the confluence flow channel 202, and the outlet end 2010 of the temperature adjustment flow channel 201 communicates with the inlet end 2020 of the confluence flow channel 202. The liquid inlet 211 and the liquid outlet 212 are located at the side of the temperature adjustment flow channel 201 and the confluence flow channel 202 in the first direction F1 away from the communicating flow channel 203. Namely, the cooling liquid can flow via the liquid inlet 211 into the temperature adjustment flow channel 201, and flow out of the confluence flow channel 202 via the liquid outlet 212; and the cooling liquid flowing out from the outlet end 2010 of the temperature adjustment flow channel 201 can flow through the communicating flow channel 203 into the inlet end 2020 of the confluence flow channel 202.

Therefore, the entry and exit of the cooling liquid and the flowing between the temperature adjustment flow channel 201 and the confluence flow channel 202 can be realized simply and effectively. The liquid inlet and liquid outlet of the temperature adjustment unit 2*a* are reliably ensured to be located at the same end, to reduce the size of the temperature adjustment unit 2*a* in the first direction F1.

Figure 3:
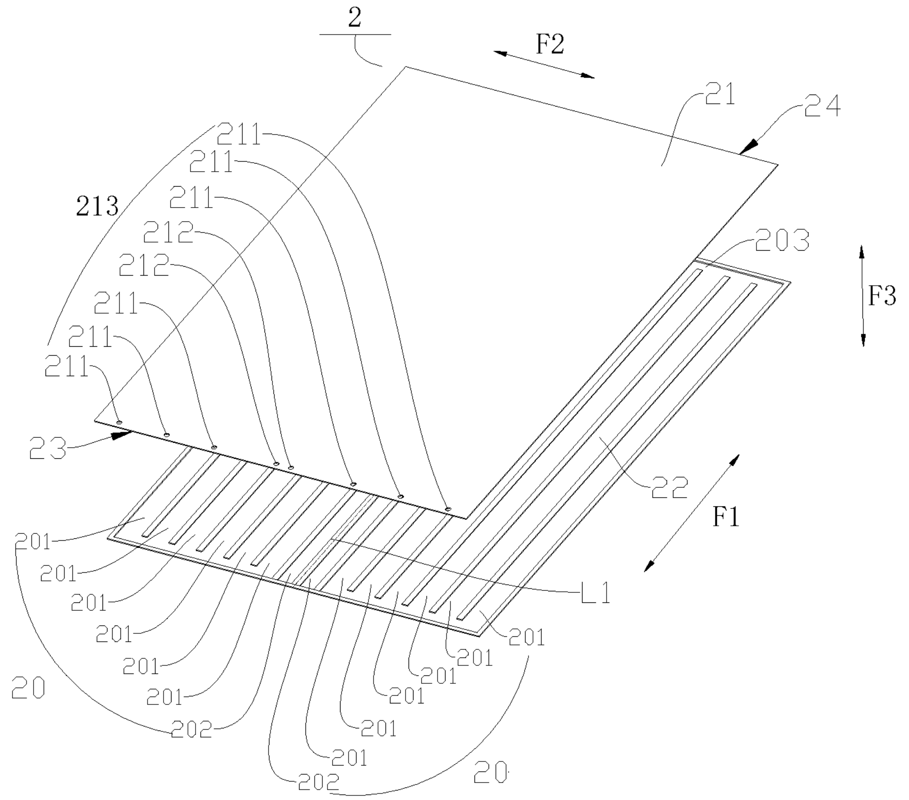
FIG. 3 is an exploded view of a bottom plate according to an embodiment of the present disclosure.

In some embodiments of the present disclosure, referring to FIG. 2 and FIG. 3, two ends of the bottom plate 2 in the first direction F1 are respectively a first end portion 23 and a second end portion 24, where the liquid inlet 211 and the liquid outlet 212 are located at the first end portion 23, and the communicating flow channel 203 is located at the second end portion 24. Therefore, the cooling liquid can enter the bottom plate 2 via the liquid inlet 211, then flow forward through the entire bottom plate 2 along the first direction F1 into the communicating flow channel 203, then flow from the communicating flow channel 203 into and flow reversely through the confluence flow channel 202 along the first direction F1, and flow out of the liquid outlet 212.

Therefore, the flow path of the cooling liquid can make full use of the bottom plate 2, and run through the area where the cells 1 are placed as much as possible, to well cool the cell 1, which is conducive to the cooling consistency of the cells 1. For example, when the tray 200 includes only one temperature adjustment unit 2*a*, the liquid inlet 211 and the liquid outlet 212 are located at the same side of the tray 200 in the first direction F1, and the communicating flow channel 203 is located at the other end of tray 200 in the first direction F1.

However, the present disclosure is not limited thereto. In other embodiments of the present disclosure, the liquid inlet 211, the liquid outlet 212 and the communicating flow channel 203 may not be located at two end portions of the bottom plate 2, for example, they are disposed along a middle portion of the bottom plate 2. Furthermore, it should be noted that when the tray 200 includes multiple temperature adjustment units 2*a*, the bottom plates 2 of two adjacent temperature adjustment units 2*a* may have a one-piece structure (i.e., different portions of one bottom plate), or separate structures (that is, two separate bottom plates).

As shown, according to some embodiments of the present disclosure, the bottom plate 2 includes a first bottom plate 21 and a second bottom plate 22 disposed opposite to each other in a thickness direction F3 of the bottom plate 2, where the temperature adjustment flow channel 201 and the confluence flow channel 202 are disposed between the first bottom plate 21 and the second bottom plate 22, and the liquid inlet 211 and the liquid outlet 212 are formed to penetrate the first bottom plate 21. Therefore, the bottom plate 2 is configured to include the first bottom plate 21 and the second bottom plate 22, to facilitate the construction of the temperature adjustment flow channel 201 and the confluence flow channel 202. The liquid inlet 211 is formed to penetrate the first bottom plate 21, to facilitate the flow-in of the cooling liquid; and the diameter of the liquid inlet 211 is not affected by the thickness of the bottom plate 2, that is, the diameter of the liquid inlet 211 may be greater than the thickness of the bottom plate 2, to reduce the flow resistance. The liquid outlet 212 is formed to penetrate the first bottom plate 21, to facilitate the flow-out of the cooling liquid; and the diameter of the liquid outlet 212 is not affected by the thickness of the bottom plate 2, that is, the diameter of the liquid outlet 212 may be greater than the thickness of the bottom plate 2, to reduce the flow resistance.

In some embodiments, the first bottom plate 21 and the second bottom plate 22 may be separate structures, or a one-piece structure. In the case of separate structures, the first bottom plate 21 and the second bottom plate 22 are fabricated separately. In the case of a one-piece structure, the temperature adjustment flow channel 201 and the confluence flow channel 202 may be extrusion formed.

In some embodiments of the present disclosure, as shown in FIG. 2 and FIG. 3, at least one temperature adjustment unit 2*a* may be a preset unit 2*b*, where the preset unit 2*b* includes multiple temperature adjustment flow channels 201 and one confluence flow channel 202, and the outlet end 2010 of each temperature adjustment flow channel 201 communicates with the inlet end 2020 of the confluence flow channel 202. Therefore, since the temperature adjustment flow channels 201 is configured to cool the cells 1, the multiple temperature adjustment flow channel 201 can increase the area that the cooling liquid flows through and the flow rate, to quickly and well cool the cells 1. In addition, one confluence flow channel 202 is configured to flow the cooling liquid after heat exchange out of the temperature adjustment unit 2*a*, thereby reducing the space occupied by the confluence flow channel 202, increasing the cooling area as much as possible, and further improving the cooling efficiency of the cell 1.

Moreover, since the multiple temperature adjustment flow channels 201 and the confluence flow channel 202 extend in the first direction F1, the length of each temperature adjustment flow channel 201 is short compared with the serpentine flow channel. Therefore, the temperature difference between the liquid inlet and outlet ends of each temperature adjustment flow channel 201 is small, so that the overall temperature of each temperature adjustment flow channel 201 is uniform and low. This improves the cooling consistency of the cells 1, and reduces the flow resistance of the cooling liquid, to save the energy consumption.

Referring to FIG. 2 and FIG. 3, according to some embodiments of the present disclosure, the temperature adjustment flow channels 201 in the preset unit 2*b* are located on the same side of the confluence flow channel 202 in the second direction F2. Since the temperature adjustment flow channels 201 is configured to cool the cells 1 and the confluence flow channel 202 does not is configured to cool the cells 1, the multiple temperature adjustment flow channels 201 are all located on the same side of the confluence flow channel 202 in the second direction F2, to promote the arrangement of the multiple cells 1, and well cool the multiple cells 1.

In some embodiments of the present disclosure, referring to FIG. 2 and FIG. 3, the tray 200 includes two preset units 2*b*, and the two preset units 2*b* are disposed at an interval in the second direction F2. Further, the two preset units 2*b* are distributed symmetrically. Therefore, the symmetric distribution of the two preset units 2*b* facilitates the arrangement of the preset units 2*b* to make the structure of the bottom plate 2 become more compact, and allow two confluence flow channels 202 in the two preset units 2*b* to get closer or allow all the temperature adjustment flow channels 201 in the two preset units 2*b* to get closer. This facilitates the arrangement of the multiple cells 1, and alleviates the problem of heat transfer between the confluence flow channel 202 in one preset unit 2*b* and the temperature adjustment flow channel 201 in another preset unit 2*b*.

Figure 4:
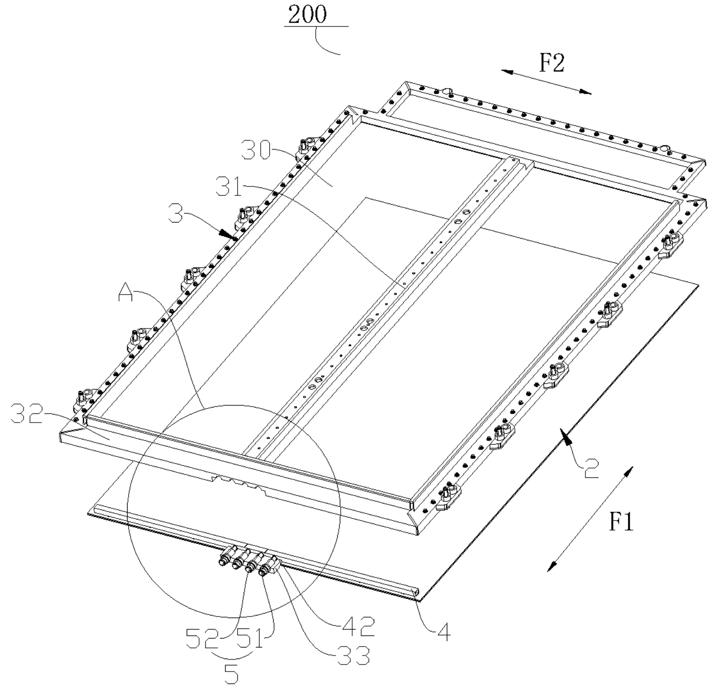
FIG. 4 is an exploded view of a tray according to an embodiment of the present disclosure.

Referring to FIG. 2 to FIG. 4, according to some embodiments of the present disclosure, the tray 200 further includes a frame 3, where the frame 3 is connected to the bottom plate 2 and defines an accommodating cavity 30 with the bottom plate 2. The frame 3 includes a support beam 31 extending in the first direction F1, where the support beam 31 is located above a portion between the preset units 2*b*, and the confluence flow channel 202 in each preset unit 2*b* is disposed opposite to the support beam 31 in the vertical direction. Therefore, the support beam 31 can enhance the structural strength of the frame 3. Moreover, the arrangement of the support beam 31 right above the confluence flow channel 202 can more effectively ensure that the confluence flow channel 202 and the battery cell 1 are staggered in the vertical direction, to avoid the heat exchange of the confluence flow channel 202 with cell 1.

In some examples shown in FIG. 2 to FIG. 4, the confluence flow channel 202 in each preset unit 2*b* is located on one side of the temperature adjustment flow channels 201 in the corresponding preset unit 2*b* close to the other preset unit 2*b*. This facilitates the arrangement of cells 1 and conforms to the structural layout of the frame 3. For example, to ensure the reliability of the frame 3, the support beam 31 can be generally disposed along the middle of the frame 3, and the support beam 31 faces the confluence flow channel 202 of the preset unit 2*b*, so that the structural reliability of the frame 3 can be ensured without affecting the cooling of the cell 1.

In some embodiments of the present disclosure, referring to FIG. 2 and FIG. 3, the temperature adjustment unit 2*a* includes N temperature adjustment flow channel 201 and M confluence flow channels 202, where M is an integer greater than or equal to 1, and, N is an integer greater than or equal to 1; and the sum of width of the N temperature adjustment flow channels 201 in each temperature adjustment unit 2*a* is greater than the sum of width of the M confluence flow channels 202. Therefore, the area where the cooling liquid flows through in the temperature adjustment flow channel 201 is large, to effectively cool the cell 1.

In an example shown in FIG. 2, the width of the temperature adjustment flow channel 201 is a mean width in the second direction F2. The temperature adjustment flow channel 201 may be an equal-width flow channel or an unequal-width flow channel. Similarly, the width of the confluence flow channel 202 is a mean width in the second direction F2. The confluence flow channel 202 may be an equal-width flow channel or an unequal-width flow channel.

As shown in FIG. 2, according to some embodiments of the present disclosure, at least one temperature adjustment unit 2*a* includes: an adapter piece 4 and an external connecting tube 5. The adapter piece 4 has a first flow channel 401 and a second flow channel 402 separated from each other therein, where the first flow channel 401 communicates with the temperature adjustment flow channel 201, and the second flow channel 402 communicates with the confluence flow channel 202. The external connecting tube 5 includes a liquid inlet pipe 51 and a liquid outlet pipe 52, where the liquid inlet pipe 51 is connected to the adapter piece 4 and communicates with the first flow channel 401, and the liquid outlet pipe 52 is connected to the adapter piece 4 and communicates with the second flow channel 402.

As such, the cooling liquid can enter the first flow channel 401 from the liquid inlet pipe 51, and flow through the first flow channel 401 to the temperature adjustment flow channel 201. The cell 1 can be disposed opposite to the temperature adjustment flow channel 201, so the cell 1 is cooled when the cooling liquid flows through the temperature adjustment flow channel 201. During the cooling process of the cell 1, hot cell 1 exchanges heat with the cooling liquid. Therefore, the temperature of the cooling liquid at the end of the temperature adjustment flow channel 201 away from the adapter piece 4 in the first direction F1 is high. The high-temperature cooling liquid flows through the confluence flow channel 202 to the second flow channel 402. The cooling liquid flowing through the second flow channel 402 does not exchange heat with the cell 1, and can flow out of the liquid outlet pipe 52 after passing through the second flow channel 402.

Therefore, by arranging the adapter piece 4, only one set of liquid inlet pipe 51 and liquid outlet pipe 52 is required to be provided even when the number of the temperature adjustment flow channel 201 and/or the confluence flow channel 202 is greater than 1, thus reducing the number of the liquid inlet pipe 51 and the liquid outlet pipe 52, and simplifying the structural complexity. However, the present disclosure is not limited thereto. Multiple sets of liquid inlet pipes 51 and liquid outlet pipes 52 may also be provided.

In the related art, a tray bottom plate of a battery pack generally has a serpentine flow channel, and liquid inlet and outlet pipes are located at a head and tail end of the serpentine flow channel and at two sides of the tray bottom plate in the length direction, causing a large size of the tray bottom plate in the length direction. Moreover, the liquid inlet and outlet pipes are directly inserted into the head and tail end of the serpentine flow channel along a direction parallel to the bottom plate. With a given thickness of the tray bottom plate, the diameter of the liquid inlet and outlet pipes is limited by the thickness of the tray bottom plate, and liquid inlet and outlet pipes with a diameter smaller than the thickness of the tray bottom plate have to be used, causing a large flow resistance to the cooling liquid.

In the battery pack 1000 according to the present disclosure, since the liquid inlet pipe 51 is connected to the temperature adjustment flow channel 201 by the adapter piece 4 and the liquid outlet pipe 52 is connected to the confluence flow channel 202 by the adapter piece 4, the liquid inlet pipe 51 and the liquid outlet pipe 52 can be located on the same side of the temperature adjustment unit 2*a* in the first direction F1, resulting in a small size of the tray 200 in the first direction F1. Moreover, by connecting the liquid inlet pipe 51 and the liquid outlet pipe 52 to the adapter piece 4, the diameter of the liquid inlet pipe 51 and the liquid outlet pipe 52 is not affected by the thickness of the bottom plate 2. With a small thickness of the bottom plate 2, a liquid inlet pipe 51 and a liquid outlet pipe 52 having a large diameter can be used, to reduce the flow resistance of the cooling liquid.

Figure 6:
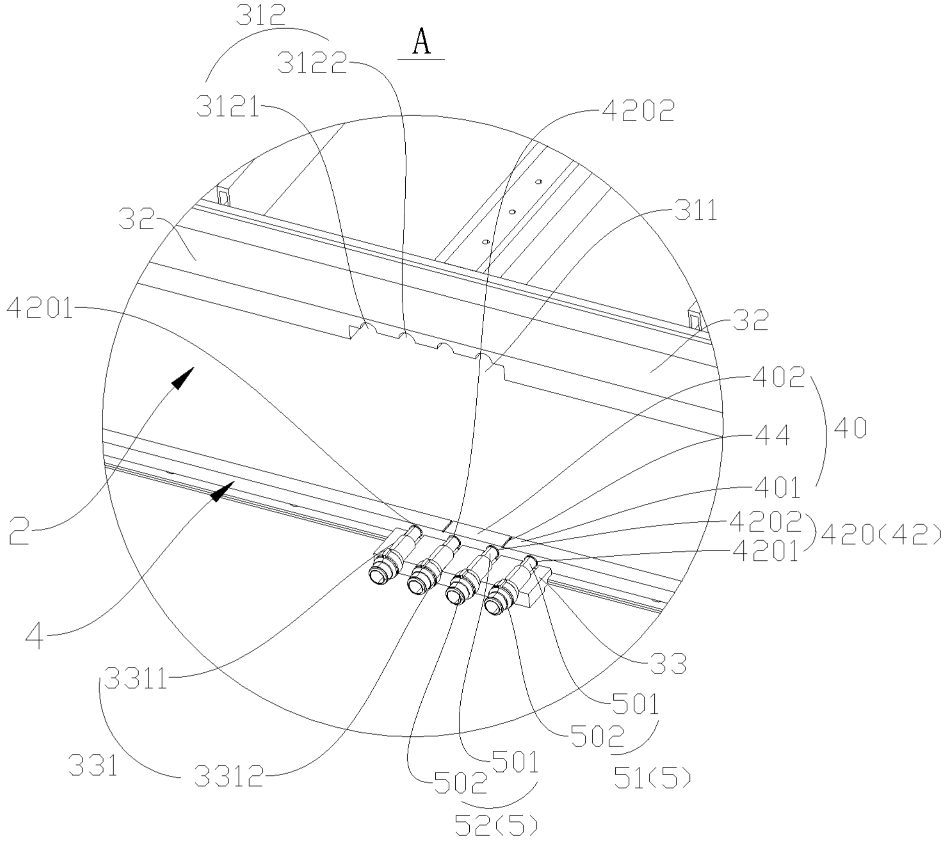
FIG. 6 is a partially enlarged view of part A in FIG. 4.
Figure 7:
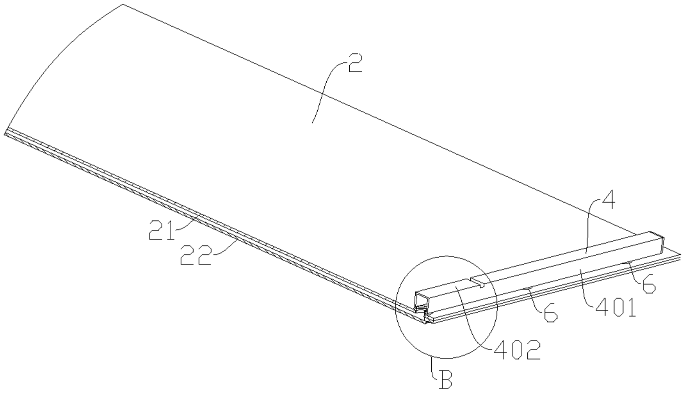
FIG. 7 is a cross-sectional view of a tray at a position according to an embodiment of the present disclosure.

As shown in FIG. 6, in some embodiments of the present disclosure, the adapter piece 4 can be a one-piece structure and the adapter piece 4 has a partition groove 44. A partition can be placed in the partition groove 44 to define the first flow channel 401 and the second flow channel 402 which are separated from each other in the adapter piece 4. However, the present disclosure is not limited thereto. In other embodiments of the present disclosure, the adapter piece 4 may be directly formed with a partition structure therein. In some embodiments, the adapter piece 4 is formed of multiple separate structures, where at least one separate structure defines the first flow channel 401, and at least one separate structure defines the second flow channel 402, etc.

Furthermore, one or multiple adapter piece 4 can be provided. When the tray 200 includes multiple temperature adjustment units 2*a* (as shown in FIG. 2 and FIG. 6), the adapter piece 4 of two adjacent temperature adjustment units 2*a* can be formed of separate structures, or the adapter piece 4 of two adjacent temperature adjustment units 2*a* can also be a one-piece structure. For example, the adapter piece 4 of a one-piece structure can be divided into multiple flow channels by a structure such as a partition, to work for corresponding temperature adjustment units 2*a*. Two temperature adjustment units 2*a* may share one adapter piece 4 and one second flow channel 402.

The tray 200 for a battery pack 1000 according to some embodiments of the present disclosure will be described in connection with the accompanying drawings.

Figure 5:
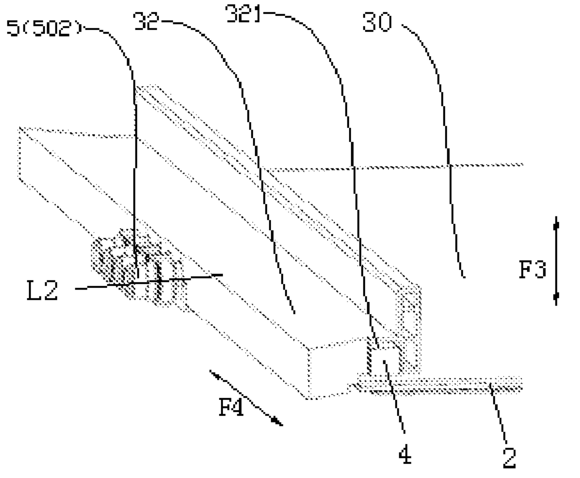
FIG. 5 is a partial schematic view of a tray according to an embodiment of the present disclosure.

As shown in FIG. 4, the tray 200 can include a bottom plate 2, a frame 3, an external connecting tube 5 and adapter piece 4. The frame 3 is connected to the bottom plate 2 and defines an accommodating cavity 30 with the bottom plate 2. The accommodating cavity 30 is configured to accommodate the battery assembly 100, and the frame 3 includes a first side beam 32. Referring to FIG. 5 and FIG. 6, an inner end 501 of the external connecting tube 5 extends into the first side beam 32, a first accommodating groove 321 is formed on the first side beam 32, the adapter piece 4 is disposed at a side of the bottom plate 2 in a thickness direction, and the adapter piece 4 is accommodated in the first accommodating groove 321. Therefore, the first accommodating groove 321 provides a mounting space for the adapter piece 4, so the first side beam 32 can protect the adapter piece 4, to reduce the damage of the adapter piece 4 from dust and corrosion. Here, it should be noted that there is on limitation on the position where the first side beam 32 is arranged. For example, the first side beam 32 can extend in a length direction of the tray 200 and disposed close to a side edge of the tray 200 in a width direction, or extend in the width direction of the tray 200 and disposed close to a side edge of the tray 200 in the length direction.

Figure 8:
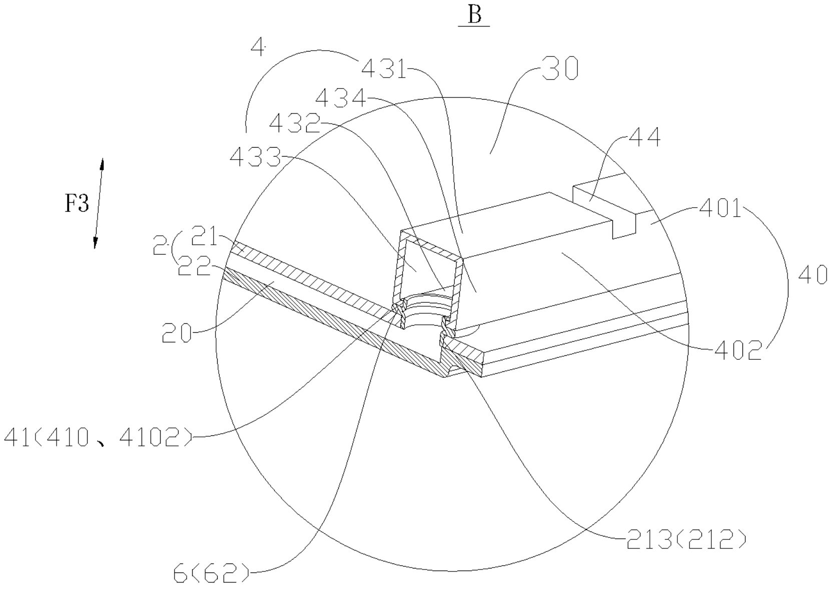
FIG. 8 is a partially enlarged view of part B in FIG. 7.
Figure 9:
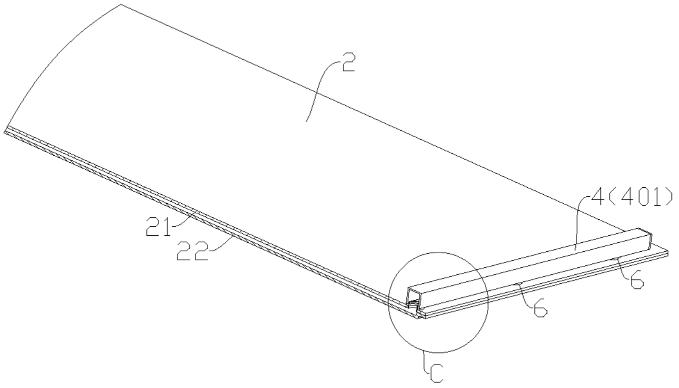
FIG. 9 is a cross-sectional view of a tray at another position according to an embodiment of the present disclosure.

Referring to FIG. 2, the bottom plate 2 has a bottom plate flow channel 20 therein, and the adapter piece 4 has a joining flow channel 40 therein. Referring to FIG. 6 and FIG. 8, the adapter piece 4 includes a first connecting portion 41 and a second connecting portion 42, where the first connecting portion 41 is connected to the bottom plate 2 to cause the joining flow channel 40 to be in communication with the bottom plate flow channel 20. The second connecting portion 42 is connected to the inner end 501 of the external connecting tube 5 to cause the joining flow channel 40 to be in communication with the external connecting tube 5, and the first connecting portion 41 and the second connecting portion 42 are buried in the first side beam 32. Therefore, the first side beam 32 can protect the first connecting portion 41 and the second connecting portion 42, that is, the connection portion of the adapter piece 4 to the bottom plate 2, and the connection portion of the adapter piece 4 and the external connecting tube 5, to improve the mounting reliability of the adapter piece 4 and reduce the risk of leakage of the cooling liquid at the connection portion.

It should be noted that the cooling liquid can flow from the external connecting tube 5 into the joining flow channel 40, and flow through the joining flow channel 40 to the bottom plate flow channel 20. Then, the cooling liquid flows through the bottom plate flow channel 20, passes through the joining flow channel 40 and flows out of the external connecting tube 5. The battery assembly 100 can be disposed above the bottom plate flow channel 20, and the cooling liquid can cool the battery assembly 100 when flows in the bottom plate flow channel 20.

In an example, referring to FIG. 6, the external connecting tube 5 can include a liquid inlet pipe 51 and a liquid outlet pipe 52, the joining flow channel 40 includes a first flow channel 401 and a second flow channel 402 separated from each other, the bottom plate flow channel 20 includes a temperature adjustment flow channel 201 and a confluence flow channel 202, the liquid inlet pipe 51 communicates with the first flow channel 401, the liquid outlet pipe 52 communicates with the second flow channel 402, the first flow channel 401 communicates with the flow channel 201, and the second flow channel 402 communicates with the confluence flow channel 202. The cooling liquid flows through the liquid inlet pipe 51 into the first flow channel 401, then flows from the first flow channel 401 to the temperature adjustment flow channel 201 and then to the confluence flow channel 202 after flowing through the temperature adjustment flow channel 201, subsequently flows from the confluence flow channel 202 to the second flow channel 402, and then flows out of the liquid outlet pipe 52. In this embodiment, the battery assembly 100 can be located above the temperature adjustment flow channel 201, or above the temperature adjustment flow channel 201 and the confluence flow channel 202.

The adapter piece 4 is connected to the external connecting tube 5, such that the external connecting tube 5 is disposed at the same side of the bottom plate 2, resulting in a small size of the tray 200. Moreover, by arranging the adapter piece 4 at a side of the bottom plate 2 in the thickness direction and connecting the external connecting tube 5 to the adapter piece 4, the diameter of the external connecting tube 5 is allowed not to be affected by the thickness of the bottom plate 2. With a small thickness of the bottom plate 2, an external connecting tube 5 having a large diameter can be used, to reduce the flow resistance of the cooling liquid. For example, the diameter of the liquid inlet pipe 51 and the liquid outlet pipe 52 is allowed not to be affected by the thickness of the bottom plate 2. With a small thickness of the bottom plate 2, a liquid inlet pipe 51 and a liquid outlet pipe 52 having a large diameter can be used, to reduce the flow resistance of the cooling liquid.

In some embodiments of the present disclosure, as shown in FIG. 5, the adapter piece 4 is in clearance fit with a groove wall of the first accommodating groove 321. Namely, the adapter piece 4 does not contact the groove wall of the first accommodating groove 321, to avoid the problem of pressure caused by the first side beam 32 to the adapter piece 4, and further protect the adapter piece 4.

In some embodiments of the present disclosure, the first connecting portion 41 is welded to the bottom plate 2, since the connection by welding is a relatively stable connection. Therefore, the first connecting portion 41 can be simply and reliably connected to the bottom plate 2, to reduce the risk of disconnection of the first connecting portion 41 from the bottom plate 2, and reduce the risk of leakage of the cooling liquid at the first connecting portion 41.

In some embodiments of the present disclosure, the second connecting portion 42 is welded to the inner end 501 of the external connecting tube 5, since the connection by welding is a relatively stable connection. Therefore, the second connecting portion 42 can be simply and reliably connected to the external connecting tube 5, to reduce the risk of disconnection of the second connecting portion 42 from the external connecting tube 5, and reduce the risk of leakage of the cooling liquid at the second connecting portion 42.

According to some embodiments of the present disclosure, as shown in FIG. 2 and FIG. 3, the bottom plate 2 is provided with a communicating liquid port 213 on a surface at one of the two sides in the thickness direction facing the adapter piece 4. Referring to FIG. 8, the first connecting portion 41 is constructed as a bottom plate connection port 410, the tray 200 further includes a welded connecting tube 6, one end of the welded connecting tube 6 is inserted into and welded to the communicating liquid port 213, and the other end of the welded connecting tube 6 is inserted into and welded to the bottom plate connection port 410, so that the first connecting portion 41 is welded to the bottom plate 2.

Therefore, by arranging the communicating liquid port 213 and the bottom plate connection port 410, the welded connecting tube 6 can be conveniently connected, to cause the bottom plate flow channel 20 to be in communication with the joining flow channel 40 by the welded connecting tube 6. Therefore, by directing the cooling liquid by the welded connecting tube 6, the cooling liquid can smoothly flow from the joining flow channel 40 to the bottom plate flow channel 20. Therefore, the difficulty and complexity of bringing the adapter piece 4 and the bottom plate 2 into communication are reduced, the structure is simplified, and the connection of the first connecting portion 41 to the bottom plate 2 by welding is promoted.

Moreover, referring to FIG. 8, the diameter of the welded connecting tube 6 can be manufactured according to the diameters of the communicating liquid port 213 and the bottom plate connection port 410. Since the communicating liquid port 213 is located on the surface at the side of the bottom plate 2 in the thickness direction facing the adapter piece 4, the port diameter of the communicating liquid port 213 is not limited by the thickness of the bottom plate 2. Therefore, the communicating liquid port 213 can be large. The bottom plate connection port 410 is provided on the surface of the adapter piece 4 at the side facing the bottom plate 2 and can also be large without limitation by the thickness of the adapter piece 4, so a welded connecting tube 6 with a larger diameter can be used, to further reduce the flow resistance of the cooling liquid, and save the energy consumption.

Referring to FIG. 6, in some embodiments of the present disclosure, the second connecting portion 42 is constructed as a connecting tube connection port 420, and the inner end 501 of the external connecting tube 5 is inserted into and welded to the connecting tube connection port 420, so the second connecting portion 42 is welded to the external connecting tube 5. Therefore, the connecting tube connection port 420 can provide a mounting environment for the external connecting tube 5, and the inner end 501 of the external connecting tube 5 is inserted into and welded to the connecting tube connection port 420, so the second connecting portion 42 can be reliably connected to the external connecting tube 5, to reduce the risk of disconnection of the second connecting portion 42 from the external connecting tube 5.

According to some embodiments of the present disclosure, as shown in FIG. 5, the outer end 502 of the external connecting tube 5 is exposed at the side of the first side beam 32 away from the accommodating cavity 30. As such, the connection of the external connecting tube 5 to other cooling liquid accommodating devices is facilitated, to introduce the cooling liquid into the tray 200 or discharge the cooling liquid from the tray 200. Moreover, the second connecting portion 42 is located on the side of the adapter piece 4 away from the accommodating cavity 30, to facilitate the connection of the second connecting portion 42 to the external connecting tube 5.

For example, in an example shown in FIG. 8, the adapter piece 4 can include a bottom surface 432, a top surface 431, an inner side surface 433 and an outer side surface 434. The bottom surface 432 is disposed opposite to the top surface 431; and in the thickness direction F3 of the bottom plate 2, the bottom surface 432 is spaced from the top surface 431, and the top surface 431 is located on the side of the bottom surface 432 away from the bottom plate 2. The inner side surface 433 and the outer side surface 434 are connected between the top surface 431 and the bottom surface 432, and the inner side surface 433 is disposed closer to the central point of the bottom plate 2 than the outer side surface 434.

Referring to FIG. 6, the connecting tube connection port 420 is formed on the outer side surface 434 of the adapter piece 4. It can be understood that the bottom surface 432, the top surface 431, the inner side surface 433 and the outer side surface 434 can define the joining flow channel 40, and the connecting tube connection port 420 is formed on the outer side surface 434 of the adapter piece 4 so as to locate at the side of the adapter piece 4 away from the accommodating cavity 30. Therefore, the external connecting tube 5 can be inserted into the outer side surface 434 from the outside to the inside, to cause the external connecting tube 5 to be in communication with the joining flow channel 40, and expose the outer end 502 of the external connecting tube 5 at the side of the first side beam 32 away from the accommodating cavity 30.

As shown in FIG. 5, in some embodiments of the present disclosure, the central axis L2 of the external connecting tube 5 is perpendicular to the length direction F4 of the adapter piece 4, and perpendicular to the thickness direction F3 of the bottom plate 2. Referring to FIG. 2, the length direction F4 of the adapter piece 4 is the second direction F2, and the extending direction of the central axis L2 of the external connecting tube 5 is the first direction F1. This facilitates the positioning, mounting and arrangement of the external connecting tube 5.

In a possible implementation, referring to FIG. 6, the external connecting tube 5 can include a liquid inlet pipe 51 and a liquid outlet pipe 52, Therefore, the positioning, mounting and arrangement of the liquid inlet pipe 51 and the liquid outlet pipe 52 are also facilitated. As shown in FIG. 2, the arrangement of multiple bottom plate connection ports 410 on the adapter piece 4 is also facilitated. The bottom plate connection ports 410 can include a first connection port 4101 and a second connection port 4102, and the communicating liquid port 213 can include a liquid inlet 211 and a liquid outlet 212. The liquid inlet 211 is connected to the first connection port 4101 in one-to-one correspondence, and the liquid outlet 212 is connected to the second connection port 4102 in one-to-one correspondence.

Figure 10:
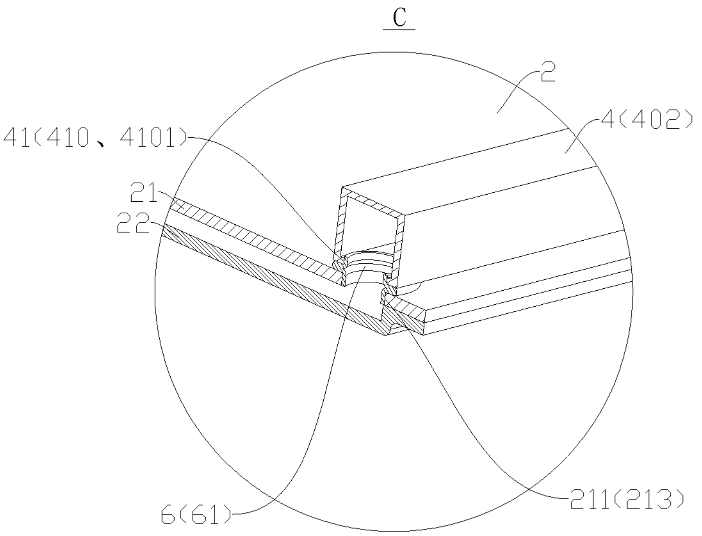
FIG. 10 is a partially enlarged view of part C in FIG. 9.
Figure 11:
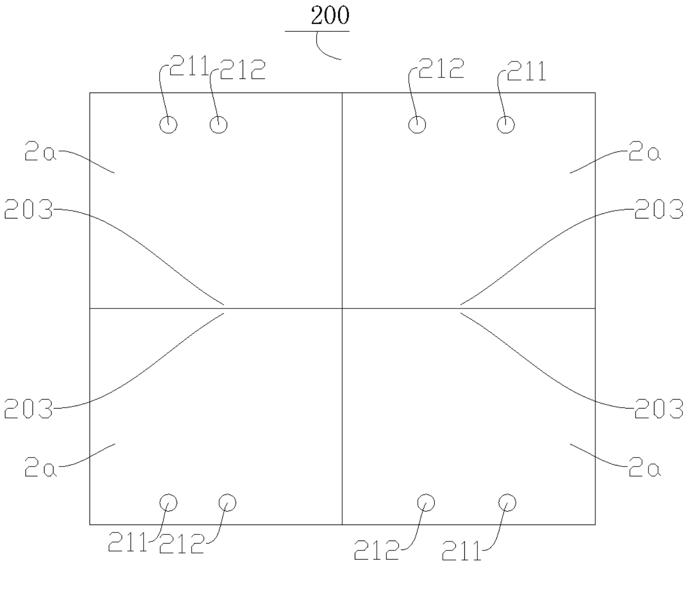
FIG. 11 is a schematic structural diagram of a bottom plate according to another embodiment of the present disclosure.

According to some embodiments of the present disclosure, referring to FIG. 2 and FIG. 3, the surface of the bottom plate 2 at one of two sides in the thickness direction facing the adapter piece 4 is provided with a liquid inlet 211 and a liquid outlet 212. The liquid inlet 211 communicates with the temperature adjustment flow channel 201, and the liquid outlet 212 communicates with the confluence flow channel 202. The surface of the adapter piece 4 at the side facing the bottom plate 2 is provided with a first connection port 4101 and a second connection port 4102. The first connection port 4101 communicates with the liquid inlet 211, and the second connection port 4102 communicates with the liquid outlet 212. Referring to FIG. 8 and FIG. 10, the welded connecting tube 6 can include a first connecting tube 61 and a second connecting tube 62. One end of the first connecting tube 61 is inserted into and fitted to the liquid inlet 211, and the other end of the first connecting tube 61 is inserted into and fitted to the first connection port 4101. One end of the second connecting tube 62 is inserted into and fitted to the liquid outlet 212, and the other end of the second connecting tube 62 is inserted into and fitted to the second connection port 4102.

As such, by arranging the liquid inlet 211 and the first connection port 4101 as described above, the mounting of the first connecting tube 61 is facilitated, to cause the temperature adjustment flow channel 201 to be in communication with the first flow channel 401 by the first connecting tube 61. Therefore, by directing the cooling liquid by the first connecting tube 61, the cooling liquid is allowed to flow smoothly from the first flow channel 401 to the temperature adjustment flow channel 201. Similarly, by arranging the liquid outlet 212 and the second connection port 4102 as described above, the mounting of the second connecting tube 62 is facilitated, to cause the confluence flow channel 202 to be in communication with the second flow channel 402 by the second connecting tube 62. Therefore, by directing the cooling liquid by the second connecting tube 62, the cooling liquid is allowed to flow smoothly from the confluence flow channel 202 to the second flow channel 402. Therefore, the difficulty and complexity of bringing the adapter piece 4 and the bottom plate 2 into communication are reduced and the structure is simplified.

Moreover, the diameter of the first connecting tube 61 can be manufactured according to the diameter of the liquid inlet 211 and the first connection port 4101. Since the liquid inlet 211 is located on the surface of the bottom plate 2 at one of two sides in the thickness direction facing the adapter piece 4, the diameter of the liquid inlet 211 is not limited by the thickness of the bottom plate 2. Therefore, the liquid inlet 211 can be large. The first connection port 4101 is provided on the surface of the adapter piece 4 at the side facing the bottom plate 2, and can also be large without limitation by the thickness of the adapter piece 4. Similarly, the diameter of the second connecting tube 62 can be manufactured according to the diameter of the diameter of the liquid outlet 212 and the second connection port 4102. Since the liquid outlet 212 is located on the surface at the side of the bottom plate 2 in the thickness direction facing the adapter piece 4, the diameter of the liquid outlet 212 is not limited by the thickness of the bottom plate 2. Therefore, the liquid outlet 212 can be large. The second connection port 4102 is provided on the surface of the adapter piece 4 at the side facing the bottom plate 2, and can also be large without limitation by the thickness of the adapter piece 4. Therefore, a first connecting tube 61 and a second connecting tube 62 with a larger diameter can be used, to further reduce the flow resistance of the cooling liquid, and save the energy consumption.

As shown in FIG. 6, in some embodiments of the present disclosure, the surface of the adapter piece 4 at the side away from the accommodating cavity 30 is provided with a connecting tube connection port 420, and the connecting tube connection port 420 includes a liquid inlet connection port 4201 and a liquid outlet connection port 4202. The liquid inlet connection port 4201 communicates with the first flow channel 401, and the liquid outlet connection port 4202 communicates with the second flow channel 402. The outlet end of the liquid inlet pipe 51 is connected to the liquid inlet connection port 4201, to introduce the cooling liquid into the first flow channel 401; and the inlet end of the liquid outlet pipe 52 is connected to the liquid outlet connection port 4202, to discharge the cooling liquid from the second flow channel 402. Therefore, the liquid inlet connection port 4201 can facilitate the connection of the liquid inlet pipe 51, to cause the liquid inlet pipe 51 to be in communication with the first flow channel 401; and the liquid outlet connection port 4202 can facilitate the connection of the liquid outlet pipe 52, to cause the liquid outlet pipe 52 to be in communication with the second flow channel 402. Moreover, the connection of the liquid inlet pipe 51 and the liquid outlet pipe 52 with an external cooling liquid system is also facilitated.

According to some embodiments of the present disclosure, as shown in FIG. 6, a sink 311 is further formed on the first side beam 32, and the sink 311 communicates with the first accommodating groove 321. A first connecting tube accommodating groove 312 communicating with the sink 311 is formed on a bottom wall of the sink 311. The frame 3 further includes a mounting seat 33, where the mounting seat 33 is embedded in the sink 311 and a second connecting tube accommodating groove 331 is formed on the mounting seat 33. The inner end 501 of the external connecting tube 5 is received in a space defined by the first connecting tube accommodating groove 312 and the second connecting tube accommodating groove 331.

Therefore, by arranging the mounting seat 33, the space defined by first connecting tube accommodating groove 312 and the second connecting tube accommodating groove 331 can provide a mounting environment for the external connecting tube 5, and protect the external connecting tube 5. By arranging the sink 311, the mounting seat 33 can be effectively taken in, to improve the structure compactness of the battery pack 1000.

For example, as shown in FIG. 6, the first connecting tube accommodating groove 312 can include a second accommodating groove 3121 and a third accommodating groove 3122. The second connecting tube accommodating groove 331 can include a fourth accommodating groove 3311 and a fifth accommodating groove 3312. The inner end 501 of the liquid inlet pipe 51 is received in a space defined by the second accommodating groove 3121 and the fourth accommodating groove 3311 and is connected to the adapter piece 4, and the outer end 502 of the liquid inlet pipe 51 is exposed at the side of the first side beam 32 away from the accommodating cavity 30. The inner end 501 of the liquid outlet pipe 52 is received in a space defined by the third accommodating groove 3122 and the fifth accommodating groove 3312 and is connected to the adapter piece 4, and the outer end 502 of the liquid outlet pipe 52 is exposed at the side of the first side beam 32 away from the accommodating cavity 30.

Therefore, the inner end 501 of the liquid inlet pipe 51 facilitates the connection to the adapter piece 4 and can be protected by the first side beam 32; and the exposure of the outer end 502 of the liquid inlet pipe 51 at the first side beam 32 facilitates the connection of the liquid inlet pipe 51 to the external cooling liquid system. The inner end 501 of the liquid outlet pipe 52 facilitates the connection to the adapter piece 4 and can be protected by the first side beam 32; and the exposure of the outer end 502 of the liquid outlet pipe 52 at the first side beam 32 facilitates the connection of the liquid outlet pipe 52 to the external cooling liquid system.

Referring to FIG. 2, in some embodiments of the present disclosure, the bottom plate flow channel 20 includes a temperature adjustment flow channel 201 and a confluence flow channel 202, the temperature adjustment flow channel 201 and the confluence flow channel 202 extend in the first direction F1, and the temperature adjustment flow channel 201 and the confluence flow channel 202 are disposed along the second direction F2. The second direction F2 intersects the first direction F1. The adapter piece 4 is located on a side of the bottom plate flow channel 20 in the first direction F1, the joining flow channel 40 includes a first flow channel 401 and a second flow channel 402 separated from each other, the first flow channel 401 communicates with the temperature adjustment flow channel 201, and the second flow channel 402 communicates with the confluence flow channel 202. One end of the temperature adjustment flow channel 201 away from the adapter piece 4 in the first direction F1 is an outlet end 2010, and one end of the confluence flow channel 202 away from the adapter piece 4 in the first direction F1 is an inlet end 2020. The outlet end 2010 of the temperature adjustment flow channel 201 communicates with the inlet end 2020 of the confluence flow channel 202. The external connecting tube 5 includes a liquid inlet pipe 51 and a liquid outlet pipe 52, where the liquid inlet pipe 51 communicates with the first flow channel 401, and the liquid outlet pipe 52 communicates with the second flow channel 402.

In some embodiments, referring to FIG. 2, the cooling liquid can enter the first flow channel 401 from the liquid inlet pipe 51, and flow through the first flow channel 401 to the temperature adjustment flow channel 201. The battery assembly 100 can be disposed opposite to the temperature adjustment flow channel 201, so the battery assembly 100 is cooled when the cooling liquid flows through the temperature adjustment flow channel 201. During the cooling process of the battery assembly 100, hot battery assembly 100 exchanges heat with the cooling liquid. Therefore, the temperature of the cooling liquid at the end of the temperature adjustment flow channel 201 away from the adapter piece 4 in the first direction F1 is high. The high-temperature cooling liquid flows through the confluence flow channel 202 to the second flow channel 402, and the cooling liquid in the second flow channel 402 flows out of the tray 200 through the liquid outlet pipe 52.

Since the liquid inlet pipe 51 is connected to the temperature adjustment flow channel 201 by the adapter piece 4 and the liquid outlet pipe 52 is connected to the confluence flow channel 202 by the adapter piece 4, the liquid inlet pipe 51 and the liquid outlet pipe 52 can be located on the same side of the bottom plate 2 in the first direction F1, resulting in a small size of the tray 200 in the first direction F1. Moreover, by arranging the adapter piece 4 at a side of the bottom plate 2 in the thickness direction and connecting the liquid inlet pipe 51 and the liquid outlet pipe 52 to the adapter piece 4, the diameter of the liquid inlet pipe 51 and the liquid outlet pipe 52 is not affected by the thickness of the bottom plate 2. With a small thickness of the bottom plate 2, a liquid inlet pipe 51 and a liquid outlet pipe 52 having a large diameter can be used, to reduce the flow resistance of the cooling liquid.

Furthermore, for a serpentine flow channel in the related art, the temperature of a head flow channel section near the liquid inlet pipe is low, leading to a good cooling effect on the battery assembly at a corresponding position; and the temperature of a tail flow channel section near the liquid outlet pipe is high, causing a poor cooling effect on the battery assembly at a corresponding position. Therefore, the overall cooling uniformity of the battery pack is poor.

According to the tray 200 in accordance with the embodiment of the present disclosure, in some embodiments, the confluence flow channel 202 can be disposed to stagger from the battery assembly 100 in the vertical direction. That is, they are not opposite to each other in the vertical direction, thereby avoiding the heat exchange of the confluence flow channel 202 with the battery assembly 100, and ensuring the cooling effect on the battery assembly 100. Namely, when the confluence flow channel 202 is disposed to stagger from the position of the battery assembly 100, the heat dissipation effect of the battery assembly 100 can be effectively ensured. Further, when multiple temperature adjustment flow channels 201 are provided and disposed along the second direction F2, since the length of each temperature adjustment flow channel 201 is short, and the temperature difference between the liquid inlet and outlet ends of each temperature adjustment flow channel 201 is small, the overall temperature of each temperature adjustment flow channel 201 is uniform and low. This improves the cooling consistency of the battery pack 1000.

Referring to FIG. 1 and FIG. 2, in some embodiments of the present disclosure, the first direction F1 is the length direction of the bottom plate 2, the second direction F2 is the width direction of the bottom plate 2, and the adapter piece 4 is provided at an end portion of the bottom plate 2 in the first direction F1. Therefore, the arrangement of the adapter piece 4 at an end portion of the bottom plate 2 can facilitate the mounting and fixation of the adapter piece 4, and simply and effectively ensure that the bottom plate 2 has a cooling effect in the entire length direction, to ensure the cooling effect of the bottom plate 2 on the battery assembly 100, simplify the structure of the bottom plate 2, and reduce the influence of the adapter piece 4 on the arrangement of the battery assembly 100. However, the present disclosure is not limited thereto. In other embodiments of the present disclosure, the adapter piece 4 may also be provided in the middle or at other positions of the bottom plate 2, which will not be further described here.

In the description of the specification, the description with reference to the terms "an embodiment", "some embodiments", "example", "specific example", or "some example" and so on means that specific features, structures, materials or characteristics described in connection with the embodiment or example are embraced in at least one embodiment or example of the present disclosure. In the specification, the schematic expressions of the above terms do not necessarily refer to the same embodiment or example. Moreover, the described specific features, structures, materials or characteristics may be combined in any suitable manners in one or more embodiments. In addition, where there are no contradictions, the various embodiments or examples described in the specification and features of various embodiments or examples can be combined by those skilled in the art.

Although the embodiments of the present disclosure have been shown and described, a person of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A battery pack, comprising:

a battery assembly, wherein the battery assembly comprises at least one battery unit, the battery unit comprises a plurality of cells, a length direction of each cell is a first direction, and the plurality of cells are disposed along a second direction; and a tray, wherein the tray comprises at least one temperature adjustment unit, the at least one temperature adjustment unit comprises a bottom plate and a plurality of temperature adjustment flow channels and a confluence flow channel formed on the bottom plate, the plurality of temperature adjustment flow channels are disposed opposite to the battery unit in a vertical direction to exchange heat with a cell of the cells, the confluence flow channel is disposed to stagger from the battery unit in the vertical direction to prevent heat exchange with the cell, the plurality of temperature adjustment flow channels and the confluence flow channel extend in the first direction, and the plurality of temperature adjustment flow channels are disposed on a same side of the confluence flow channel along the second direction; and in the first direction, each of the plurality of temperature adjustment flow channels has an outlet end, the confluence flow channel has an inlet end that communicates with the outlet end of each of the plurality of temperature adjustment flow channels, and the second direction intersects the first direction.

2. The battery pack according to claim 1, wherein the at least one temperature adjustment unit further comprises: a communicating flow channel, a liquid inlet, and a liquid outlet formed on the bottom plate, wherein the liquid inlet communicates with one of the plurality of temperature adjustment flow channels, the liquid outlet communicates with the confluence flow channel, the communicating flow channel is disposed adjacent to the outlet end of the one of the plurality of temperature adjustment flow channels and the inlet end of the confluence flow channel, the communicating flow channel causes the outlet end of the one of the plurality of temperature adjustment flow channels to be in communication with the inlet end of the confluence flow channel, and the liquid inlet and the liquid outlet are disposed on a side of the one of the plurality of temperature adjustment flow channels and the confluence flow channel away from the communicating flow channel in the first direction.

3. The battery pack according to claim 2, wherein two ends of the bottom plate in the first direction are respectively a first end portion and a second end portion, the liquid inlet and the liquid outlet are located at the first end portion, and the communicating flow channel is located at the second end portion.

4. The battery pack according to claim 2, wherein the bottom plate comprises a first bottom plate and a second bottom plate disposed opposite to each other in a thickness direction of the bottom plate, the plurality of temperature adjustment flow channels and the confluence flow channel are disposed between the first bottom plate and the second bottom plate, and the liquid inlet and the liquid outlet are formed to penetrate through the first bottom plate.

5. The battery pack according to claim 1, wherein the at least one temperature adjustment unit comprises two temperature adjustment units, and the two temperature adjustment units are disposed at an interval along the second direction, and each of the two temperature adjustment units comprises a plurality of temperature adjustment flow channels and a confluence flow channel.

6. The battery pack according to claim 5, wherein the tray further comprises a frame, the frame is connected to the bottom plate and defines an accommodating cavity with the bottom plate, the frame comprises a support beam extending in the first direction, the support beam is located above a portion between the two temperature adjustment units, and the confluence flow channel in each of the two temperature adjustment units is disposed opposite to each other with respect to the support beam.

7. The battery pack according to claim 1, wherein the at least one temperature adjustment unit comprises M confluence flow channels, and the plurality of temperature adjustment flow channels comprises N temperature adjustment flow channels, wherein M is an integer greater than or equal to 1, and N is an integer greater than 1; and a sum of width of the N temperature adjustment flow channels is greater than a sum of width of the M confluence flow channels.

8. The battery pack according to claim 1, wherein the at least one temperature adjustment unit further comprises:

an adapter piece, wherein the adapter piece has a first flow channel and a second flow channel separated from each other, the first flow channel communicates with one of the plurality of temperature adjustment flow channels, and the second flow channel communicates with the confluence flow channel; and an external connecting tube, wherein the external connecting tube comprises a liquid inlet pipe and a liquid outlet pipe, the liquid inlet pipe is connected to the adapter piece and communicates with the first flow channel, and the liquid outlet pipe is connected to the adapter piece and communicates with the second flow channel.

9. The battery pack according to claim 2, wherein the at least one temperature adjustment unit further comprises:

an adapter piece, wherein the adapter piece has a first flow channel and a second flow channel separated from each other, the first flow channel communicates with one of the plurality of temperature adjustment flow channels, and the second flow channel communicates with the confluence flow channel; and an external connecting tube, wherein the external connecting tube comprises a liquid inlet pipe and a liquid outlet pipe, the liquid inlet pipe is connected to the adapter piece and communicates with the first flow channel, and the liquid outlet pipe is connected to the adapter piece and communicates with the second flow channel.

10. The battery pack according to claim 3, wherein the at least one temperature adjustment unit further comprises:

an adapter piece, wherein the adapter piece has a first flow channel and a second flow channel separated from each other, the first flow channel communicates with one of the plurality of temperature adjustment flow channels, and the second flow channel communicates with the confluence flow channel; and an external connecting tube, wherein the external connecting tube comprises a liquid inlet pipe and a liquid outlet pipe, the liquid inlet pipe is connected to the adapter piece and communicates with the first flow channel, and the liquid outlet pipe is connected to the adapter piece and communicates with the second flow channel.

11. The battery pack according to claim 4, wherein the at least one temperature adjustment unit further comprises:

an adapter piece, wherein the adapter piece has a first flow channel and a second flow channel separated from each other, the first flow channel communicates with one of the plurality of temperature adjustment flow channels, and the second flow channel communicates with the confluence flow channel; and an external connecting tube, wherein the external connecting tube comprises a liquid inlet pipe and a liquid outlet pipe, the liquid inlet pipe is connected to the adapter piece and communicates with the first flow channel, and the liquid outlet pipe is connected to the adapter piece and communicates with the second flow channel.

12. The battery pack according to claim 5, wherein each of the two temperature adjustment units comprises:

an adapter piece, wherein the adapter piece has a first flow channel and a second flow channel separated from each other, the first flow channel communicates with one of the plurality of temperature adjustment flow channels, and the second flow channel communicates with the confluence flow channel; and an external connecting tube, wherein the external connecting tube comprises a liquid inlet pipe and a liquid outlet pipe, the liquid inlet pipe is connected to the adapter piece and communicates with the first flow channel, and the liquid outlet pipe is connected to the adapter piece and communicates with the second flow channel.

13. The battery pack according to claim 7, wherein the at least one temperature adjustment unit further comprises:

an adapter piece, wherein the adapter piece has a first flow channel and a second flow channel separated from each other, the first flow channel communicates with one of the plurality of temperature adjustment flow channels, and the second flow channel communicates with the confluence flow channel; and an external connecting tube, wherein the external connecting tube comprises a liquid inlet pipe and a liquid outlet pipe, the liquid inlet pipe is connected to the adapter piece and communicates with the first flow channel, and the liquid outlet pipe is connected to the adapter piece and communicates with the second flow channel.

* * * * *